D. H. TWAITS.
GREASE CUP CAP.
APPLICATION FILED DEC. 22, 1913.

1,225,077.

Patented May 8, 1917.

Witnesses:
O. M. Kappler.
Justin W. Macklin

Inventor
Daniel H. Twaits,
BY Albert H. Baker,
Attorney

UNITED STATES PATENT OFFICE.

DANIEL H. TWAITS, OF CHICAGO, ILLINOIS.

GREASE-CUP CAP.

1,225,077. Specification of Letters Patent. Patented May 8, 1917.

Application filed December 22, 1913. Serial No. 808,165.

*To all whom it may concern:*

Be it known that I, DANIEL H. TWAITS, a citizen of the United States, residing at Chicago, in the county of Cook and State of Illinois, have invented a certain new and useful Improvement in Grease-Cup Caps, of which the following is a full, clear, and exact description reference being had to the accompanying drawings.

This invention relates to grease cups of a type wherein there are two members, one of which screws onto another and a spring detent is provided for preventing one of the members becoming inadvertently removed from the other.

The object is to provide an efficient detent spring which may be cheaply manufactured and readily secured to one of the members of the cup.

My invention is hereinafter fully described and the essential characteristics set forth in the claims.

Figure 1:
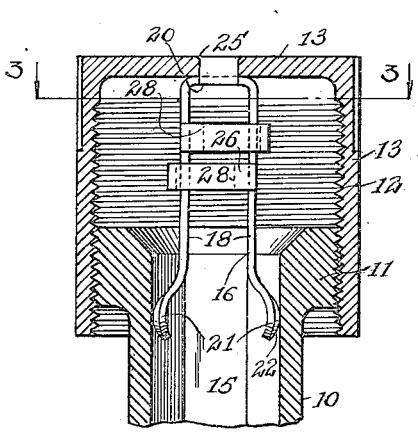
Figure 2:
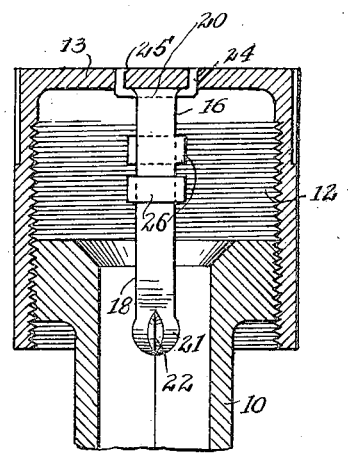
Figure 3:
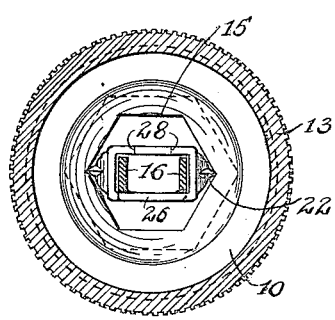
Figure 4:
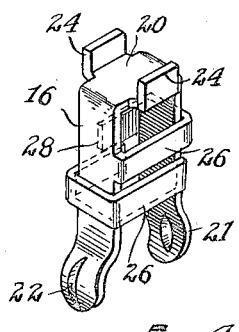

Figure 1 is a central vertical section of the grease cup showing my spring mounted therein; Fig. 2 is a central vertical section of the same taken at right angles to the plane of Fig. 1; Fig. 3 is a horizontal section taken substantially on the line 3—3 of Fig. 1; Fig. 4 is a perspective view of the detent spring by itself.

In the drawings, 10 indicates a grease cup body having an enlarged portion forming a head provided on its periphery with threads which coöperate with the threads 12 formed on the interior of the cap 13. The interior of the body 10 may be provided with vertical grooves or may be made angular as shown at 15 which provides means for engaging the detent spring 16 to prevent the cap inadvertently turning and thereby becoming displaced or lost.

The spring 16 comprises two legs 18 joined at their upper ends at 20, forming in effect a substantially U-shaped spring. At their lower ends the legs are rounded outwardly and then inwardly as at 21 and are preferably provided with small humps 22 adapted to engage the grooves or angular portions of the body 10. At the connecting portion 20 are provided two legs 24, preferably integral with this portion, which extend outwardly and then upwardly from the connecting portion and are passed through the top of the cap and upset as at 25 to securely hold the spring in place.

Carried by the side of the legs 18 is a wing member 26 extending in a U-shape around the opposite leg and ending at 28 adjacent the leg carrying it. These wing members are preferably made integral with the legs carrying them but I do not wish to be limited to this construction as they may be secured thereto in any convenient manner. Each wing member embraces the sides of the opposite leg which prevents one leg being bent out of its normal relation with the other in case the ends 21 of the spring should become caught or for some reason should be held against turning, thereby tending to cause the spring to be bent or distorted by the turning of the cap.

This spring may be readily bent into the shape shown, from a blank which may be conveniently stamped from a piece of sheet metal, and accordingly it will be seen that it may be very cheaply manufactured.

Having thus described my invention, what I claim is:

1. The combination of a grease cup comprising a cap member and a body member coöperating therewith, and a substantially U-shaped spring secured to one of the members, and means carried by one of the legs of the spring for preventing distortion of the spring, said body member having means engaging the free ends of said spring.

2. The combination of a grease cup comprising a cap and a body portion and a substantially U-shaped spring secured at the connecting portion thereof to one of said members and engaging the other member at the free ends of the spring and having means carried by one of the sides of the U of the spring and engaging the other side thereof, said body member having means engaging the free ends of said spring.

3. The combination of a grease cup comprising a cap member and a body member secured thereto, and a substantially U-shaped spring having two legs and a connecting portion secured to one of the members at the connection between the legs of the spring, and means carried by one of the legs and embracing the other leg, said body member having means engaging the free ends of said spring.

4. In a grease cup, the combination of a body portion and a cap threaded thereon, a spring having two legs and a connecting portion forming a U, and means connecting the two legs and carried by them respectively for preventing distortion of the spring, said body member having means engaging the free ends of said spring.

5. The combination of a grease cup comprising a body portion and a cap member threaded on the body portion, a spring having two legs connected together at one end and having means for securing the spring to the cap, and means carried by one of the legs and extending around the other limiting the movement of the legs in one direction, said body portion having a non-circular portion engaging the free ends of the spring.

6. The combination of a grease cup comprising a body member and a cap member threaded on the body member, of a spring formed of a flat strip having two legs secured together at one end and flaring outwardly at the free ends, means for securing said spring at the connected end of the legs to the cap, and means carried by one leg of the spring engaging the other leg, said body portion having a non-circular portion engaging the free ends of the spring.

7. The combination of a grease cup comprising a body member and a cap member threaded thereto, a spring having two legs and a connecting portion, means carried by the connecting portion for securing the spring to the cap, and means carried by one of the legs and engaging the other allowing the legs to move toward and away from each other but tending to prevent one leg moving laterally with relation to the other, said body portion having a non-circular portion engaging the free ends of the spring.

8. In a grease cup, the combination of a body portion and a cap threaded thereon and a spring having two legs and a connecting portion forming a U, means carried by one of the legs having two parallel portions engaging opposite sides of the other leg, and means for securing the spring to the cap, said body portion having a non-circular portion engaging the free ends of the spring.

9. In a grease cup, the combination of a body portion and a cap portion threaded thereon and a spring formed of a flat strip having two legs and a connecting portion forming a U, said legs flaring outwardly at their free ends, and means carried by the connecting portion for engaging the cap, and a wing secured by one of the legs and extending around the other, said wing having parallel sides engaging the sides of said last named leg while allowing the legs to be moved toward and away from each other, but limiting their outward movement, said body portion having a non-circular portion engaging the free ends of the spring.

10. The combination of a grease cup comprising a cap member and body member, one screwing onto the other, a substantially U-shaped spring formed of a flat strip, means securing the spring at its connecting portion to one of the members, the free ends being adapted to engage the other member, a projection carried by one leg of the spring and slidably engaging the other preventing excessive lateral movement of one leg with relation to the other.

11. In a grease cup, the combination of a body and a cap threaded thereon and having an opening in its top, a spring having two legs and a connecting portion, means extending from the connecting portion through the opening in the cap and being upset at the top of the cap to secure the spring to the cap, said legs being flared outwardly at their lower ends, and projections pressed from the flaring portions and adapted to engage the body, said body member having means engaging the free ends of said spring.

12. In a grease cup, the combination of a body having vertical grooves on the interior, a cap threaded on the body having openings in its top and a spring having two legs and a connecting portion, lugs extending from the connecting portion through the openings in the cap and being upset at the top of the cap, wing members carried by each leg and extending around and having two parallel portions engaging the sides of the other leg, said legs at their lower ends engaging the grooves in the body portion.

In testimony whereof, I hereunto affix my signature in the presence of two witnesses.

DANIEL H. TWAITS.

Witnesses:
H. L. HALL,
W. G. MORFORD.